Nov. 7, 1933.  G. A. SUTTON  1,934,571
TIRE POP VALVE
Filed Oct. 8, 1928
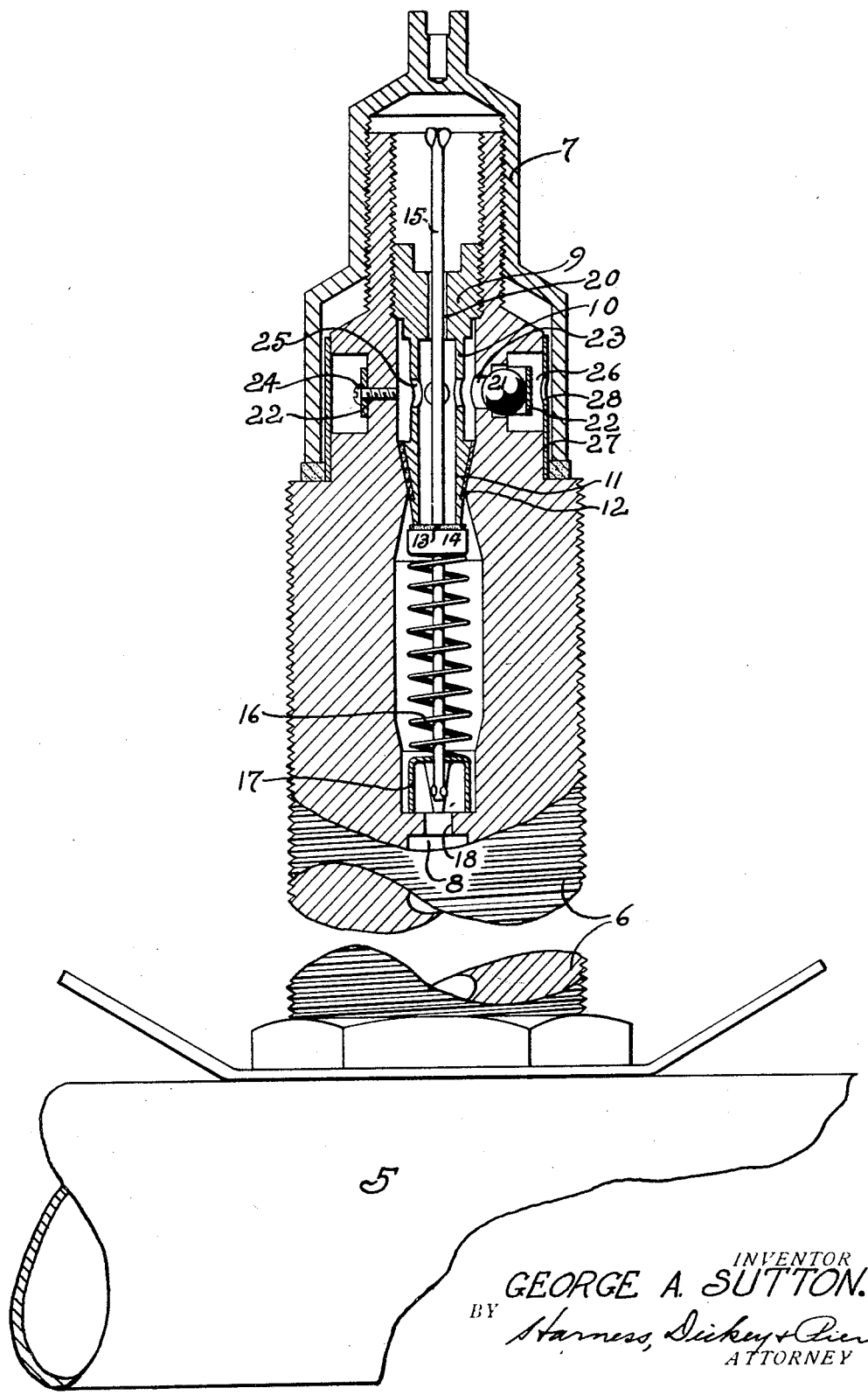
INVENTOR
GEORGE A. SUTTON.
BY Harness, Dickey & Pierce
ATTORNEY Patented Nov. 7, 1933

1,934,571

UNITED STATES PATENT OFFICE 1,934,571

TIRE POP VALVE

George A. Sutton, Pontiac, Mich., assignor to Tire Pop-Valve Company, a corporation of Michigan Application October 8, 1928. Serial No. 311,039

5 Claims. (Cl. 152—11.5)

My invention relates to tire pop-valves and has for one of its primary objects the provision of such a valve in the ordinary valve stem of a tire.

Among the specific objects of my invention are the provision of a simple and economical construction, as well as one which lends itself to compactness and introduction into a conventional tire valve stem. Another object is to so construct the device that it may accurately function to prevent the introduction of air into the tire after a predetermined pressure has been built up within the tire, as well as one which will not function until the desired pressure has been built up within the tire.

Another object is to provide means for housing the pop-valve construction to protect it, as well as means coupled with the housing structure for the production of an audible signal when the pop or relief valve has been operated.

With the above and other objects in view my invention consists in the arrangement, combination and construction of the various parts of my improved device as described in the specification claimed in my claims and shown in the accompanying drawing, in which:

The single figure is a central vertical sectional view of a tire valve construction wherein my invention is applied, the tire itself being shown fragmentally.

I have shown a tire 5 to which is secured a conventional tubular valve casing 6 having the conventional cap 7 on the free end thereof.

An outer tubular casing member 6 is provided with a central passage 8 to permit the passage of air into the tire. Fixed within the tubular member is shown an interior organization providing a second tubular member comprising a head portion 9, an intermediate portion 10 and a bottom or base portion 11. The portion 11 is tapered and provided with a rubber sleeve 12 which encircles the same to seal it within the passage 8 of the tubular member 6. The extreme lower end of base member 11 acts as a valve seat against which a rubber valve member 13 carried on the enlarged portion 14 of an elongated stem 15 is adapted to seat in order to prevent the passage of air from within the tire 5 outwardly through that portion of passage 8 which is above valve 13. The valve is normally held on its seat by a coil spring 16 which bears at its top against the enlargement 14 and at its bottom against the member 17, which latter member is supported within the tubular member 6 by the flange 18 within the tubular member. This spring encircles the lower portion of the stem 15. This is shown as extending through not only an outer chamber, above the head 9, and an inner chamber coaxial therewith and containing said spring, but an intermediate chamber provided with a valved lateral opening to a peripheral groove hereinafter referred to.

The upper portion 9 of the inserted or second tubular member acts as a guide for the stem 15, but a clearance is provided between the said member and the stem to form an air passage 20 permitting air which is introduced from the outer chamber at the extreme top of tubular member 6 to pass through the head portion 9, the intermediate chamber which receives portion 10 of any interior organization and the base portion 11 to the valve 13. The air passage 20 is constructed so as to present a smaller cross sectional area than does the air passage which will be provided past the valve 13 functionally between said intermediate chamber and said inner chamber when that valve is open, so that the pressure manifested within the intermediate chamber provided by portion 10 will be that prevailing within the tire casing and not that of the outer chamber provided by the tubular casing 6. In other words, if an air hose be applied to the free end of casing 6 and air under a pressure of, say 150 pounds, be introduced to the casing and it were desired to limit the pressure in the tire to, say 40 pounds, it becomes necessary to provide some means to assure that the pressure applied to the relief or pop valve shall be that prevailing within the tire and not that being applied to the valve casing from the source of air.

In order to prevent the further entry of air into the tire when a predetermined desired pressure has been provided therein, I provide a relief valve structure. This may include any additional valve element having a spherical seating surface such as that provided by a ball 21, shown as pressed by a flat spring member 22 against a seat provided around the mentioned lateral opening 23 in the member 6. This spring member or other means rendering the action of an additional valve of the indicated character conditional on predetermined pressure in the inner and intermediate chambers may be secured on the member 6 in any one of a number of different ways. I have shown it as being secured in place by a rivet or screw 24 which extends through spring member 22 and into the member 6, both said ball and said spring being within the periphery of this member. The intermediate portion 10 of the inserted tubular member may be provided with one or more openings 25 in its side which are adapted to render the space between the tubular members a part of said intermediate chamber and to co-operate with the opening 23 to permit the air within the intermediate portion 10 to escape and bear against the inside of the ball 21. Inasmuch as the pressure of this air is identical with the pressure obtaining against the tire during the time when the tire is being inflated and the valve is open, the tension of spring 22 on the ball is set so that the ball may be pushed off its seat when the desired pressure has been built up within the tire casing. It is understood of course that means may be provided for varying the tension of spring 22. Quite generally, however, the spring will be of a predetermined strength for application to pre-determined sizes of tires.

It will be noted that I provide a peripheral groove 26 around the casing 6 opposite the mentioned intermediate chamber and within which the ball and spring are mounted. In order to close this groove and protect the relief valve mechanism a housing 27 may be provided, the same consisting of a tubular piece conforming in contour to the shape of the member 6 at the point of its assembly thereto. The housing may be secured in place by soldering or any other desirable means. The housing is provided with an opening 28 to permit the escape of air when the relief valve is opened. This opening 28 is directly opposite the spring 22, so that the spring will over-lie the opening when the ball 21 is moved off its seat. I find that, by reason of the overlying of the opening 28 by the spring 22, an alternating audible signal is provided when the air is escaping through the relief valve, said spring then serving additionally the function of a vibratory sound-producing means in the form of a reed, comparable with those of certain wind instruments.

It will be readily apparent that my improved device adds but little to the cost of a conventional tire valve structure and provides efficient means whereby the tire may be accurately filled with air to a desired predetermined pressure. It will be obvious that changes will be made in the arrangement, combination and construction of the various parts of my improved device without departure from the spirit of my invention and it is my intention to cover by my claims such changes as may be reasonably included within the scope thereof.

I claim:

1. In combination, a tubular member, a valve seat member received within said tubular member, said valve seat member having an opening therethrough, said opening comprising a portion of restricted area at one end and a large portion at the other end, a valve cooperating with the end of said valve seat member in which said large portion is formed to normally permit air to flow through said tubular member in one direction only, said valve seat member having an intermediate chamber and an opening through the side wall thereof between said valve and said small portion of said opening, said tubular member having an opening through the side wall thereof in communication with said intermediate chamber through said opening in said side wall of said valve seat member, and a spring pressed valve member normally closing said opening in the side wall of said tubular member against the escape of air therethrough from the interior of said tubular member.

2. A valve stem for an automobile tire including a unit cylindrical member provided with a central passage and a passage transverse thereto, a sealing valve having a unit shaft which extends to the end of said member removable as a unit from said central passage and disposed below said transverse passage, and a second valve, for sealing said transverse passage, supported in the wall of said tube.

3. A valve stem for an automobile tire including a unit cylindrical member provided with a central passage and a passage communicating therewith; a sealing valve having a unit shaft which extends to the end of said member removable as a unit from said central passage and sealing both said passages, and a second valve for sealing said communicating passage and supported within the confines of said stem in the body portion thereof.

4. A valve for an automobile tire including a unit cylindrical member provided with a central passage, a sealing valve removable as a unit from said central passage, a pop valve associated with the end of said cylindrical member above said sealing valve and a unit stem on said sealing valve projecting beyond said pop valve to the end of said cylinder member.

5. A pop valve mounted in the body portion of a unit tire valve stem within the confines of its outside dimension independent of but in communication with a passage therethrough, and a sealing valve having a shaft which extends to the end of said member insertable in and removable from said passage, and sealing said passage below said pop valve against the escape of air from the stem.

GEORGE A. SUTTON.